United States Patent
Vinnakota

(10) Patent No.: US 11,048,761 B2
(45) Date of Patent: Jun. 29, 2021

(54) SEMANTIC CONTEXTUAL ELEMENT LINKING

(71) Applicant: BUSINESS OBJECTS SOFTWARE LTD., Dublin (IE)

(72) Inventor: Devicharan Vinnakota, Bangalore (IN)

(73) Assignee: Business Objects Software Ltd., Dublin (IE)

( * ) Notice: Subject to any disclaimer, the term of this patent is extended or adjusted under 35 U.S.C. 154(b) by 209 days.

(21) Appl. No.: 16/218,755

(22) Filed: Dec. 13, 2018

(65) Prior Publication Data

US 2020/0192937 A1    Jun. 18, 2020

(51) Int. Cl.
| | |
|---|---|
| *G06F 7/02* | (2006.01) |
| *G06F 16/00* | (2019.01) |
| *G06F 16/907* | (2019.01) |
| *G06F 16/9035* | (2019.01) |
| *G06Q 10/06* | (2012.01) |
| *G06F 16/901* | (2019.01) |
| *G06F 40/30* | (2020.01) |

(52) U.S. Cl.
CPC ........ *G06F 16/907* (2019.01); *G06F 16/9024* (2019.01); *G06F 16/9035* (2019.01); *G06F 40/30* (2020.01); *G06Q 10/063* (2013.01)

(58) Field of Classification Search
CPC .. G06F 16/907; G06F 16/9035; G06F 16/903; G06F 16/9024; G06F 40/30; G06Q 10/063
See application file for complete search history.

(56) References Cited

U.S. PATENT DOCUMENTS

| | | | | |
|---|---|---|---|---|
| 7,716,257 | B2* | 5/2010 | Thomson | G06F 16/3334 707/809 |
| 8,051,102 | B2* | 11/2011 | Everett | G06F 16/284 707/793 |
| 10,430,180 | B2* | 10/2019 | Kakhandiki | G06F 8/658 |
| 2006/0277584 | A1* | 12/2006 | Taylor | H04N 21/4622 725/112 |
| 2014/0236984 | A1 | 8/2014 | Vinnakota | |
| 2016/0180573 | A1 | 6/2016 | Jain et al. | |
| 2018/0181597 | A1 | 6/2018 | Jain et al. | |
| 2019/0265992 | A1* | 8/2019 | Pai | G06F 9/454 |

* cited by examiner

*Primary Examiner* — Bruce M Moser

(74) *Attorney, Agent, or Firm* — Fish & Richardson P.C.

(57) ABSTRACT

Methods, systems, and computer-readable storage media for receiving, by a semantic context service, a semantic context associated with a report generated by a first analytical tool, storing, by the semantic context service, the semantic context, receiving, by the semantic context service, a semantic context request from a second analytical tool, the semantic context request including a set of parameters, determining, by the semantic context service, a response to the semantic context request based on the set of parameters, the response including the semantic context, and returning, by the semantic context service, the response to the second analytical tool, the second analytical tool applying the semantic context to a report generated by the second analytical tool.

20 Claims, 4 Drawing Sheets

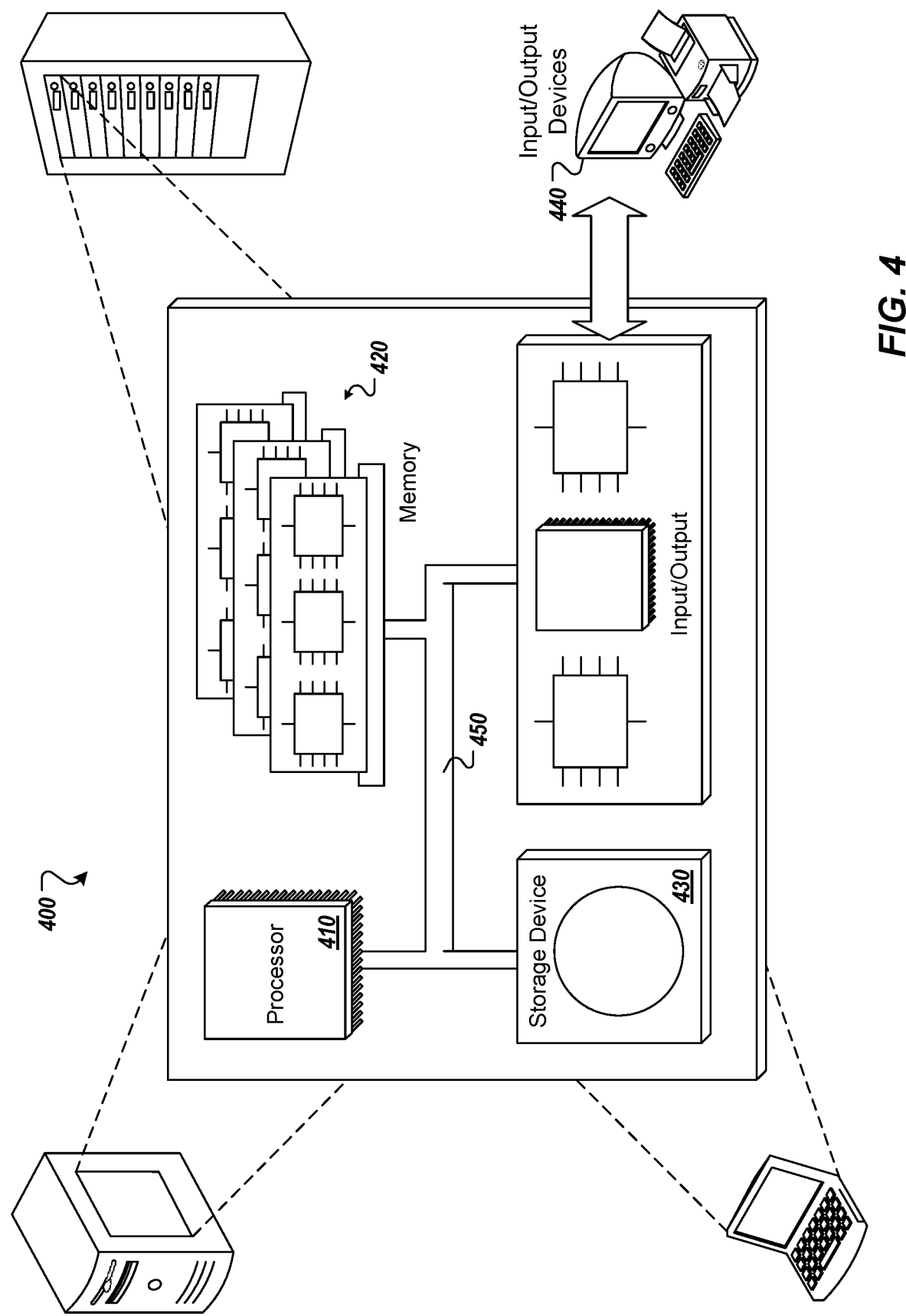

SEMANTIC CONTEXTUAL ELEMENT LINKING

BACKGROUND

Enterprises can generate and operate based on significant amounts of data from various data sources. Enterprise data warehousing (EDW) systems function as central repositories for enterprises, and store data from across multiple, disparate data sources (e.g., enterprise systems, flat files, databases, web services). Systems also provide reporting and data analysis functionality. For example, analytical and visualization tools can be used to process data, and provide reports and visualizations to enable users to understand, and make practical use of the data. A semantic layer can be provided that enables a practical representation (e.g., business representation) of the underlying data, and enables users to interact with the data without having to know the complexities of the underlying data sources.

In traditional reporting systems, users are provided with an analytical dashboard that includes analytical visual artifacts. These artifacts can be provided from multiple, disparate data sources (e.g., data sources that feed into an EDW system). To assist users, features such as report element linking can be provided. In report element linking, data context can be passed to the linked visualizations within the same reporting document. Such links, however, are manually established so the user can carry forward the analytical context. This becomes complicated when the user has multiple, disparate analytical tools. Each of the analytical tools provides a respective user experience. Consequently, in working across analytical tools, the analytical, semantic context, in which a user is operating, is lost and needs to be reset within each analytical tool.

SUMMARY

Implementations of the present disclosure are directed to analytical tools for data reporting. More particularly, implementations of the present disclosure are directed to a semantic context service that persists semantic context across multiple analytical tools.

In some implementations, actions include receiving, by a semantic context service, a semantic context associated with a report generated by a first analytical tool, storing, by the semantic context service, the semantic context, receiving, by the semantic context service, a semantic context request from a second analytical tool, the semantic context request including a set of parameters, determining, by the semantic context service, a response to the semantic context request based on the set of parameters, the response including the semantic context, and returning, by the semantic context service, the response to the second analytical tool, the second analytical tool applying the semantic context to a report generated by the second analytical tool. Other implementations of this aspect include corresponding systems, apparatus, and computer programs, configured to perform the actions of the methods, encoded on computer storage devices.

These and other implementations can each optionally include one or more of the following features: the semantic context is automatically published to the semantic context service in response to user selection of the semantic context in the report generated by the first analytical tool; the semantic context is provided based on metadata of the first analytical tool; the metadata includes descriptions of connections to data sources, context identifiers, data source identifiers, dimensions, and current filters; the semantic context request is automatically sent by the second analytical tool in response to user action to the report generated by the second analytical tool; the semantic context is automatically published to the semantic context service by the first analytical tool; and the second analytical tool subscribes to the semantic context service.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 4 is a schematic illustration of example computer systems that can be used to execute implementations of the present disclosure.

Like reference symbols in the various drawings indicate like elements.

DETAILED DESCRIPTION

Figure 1:
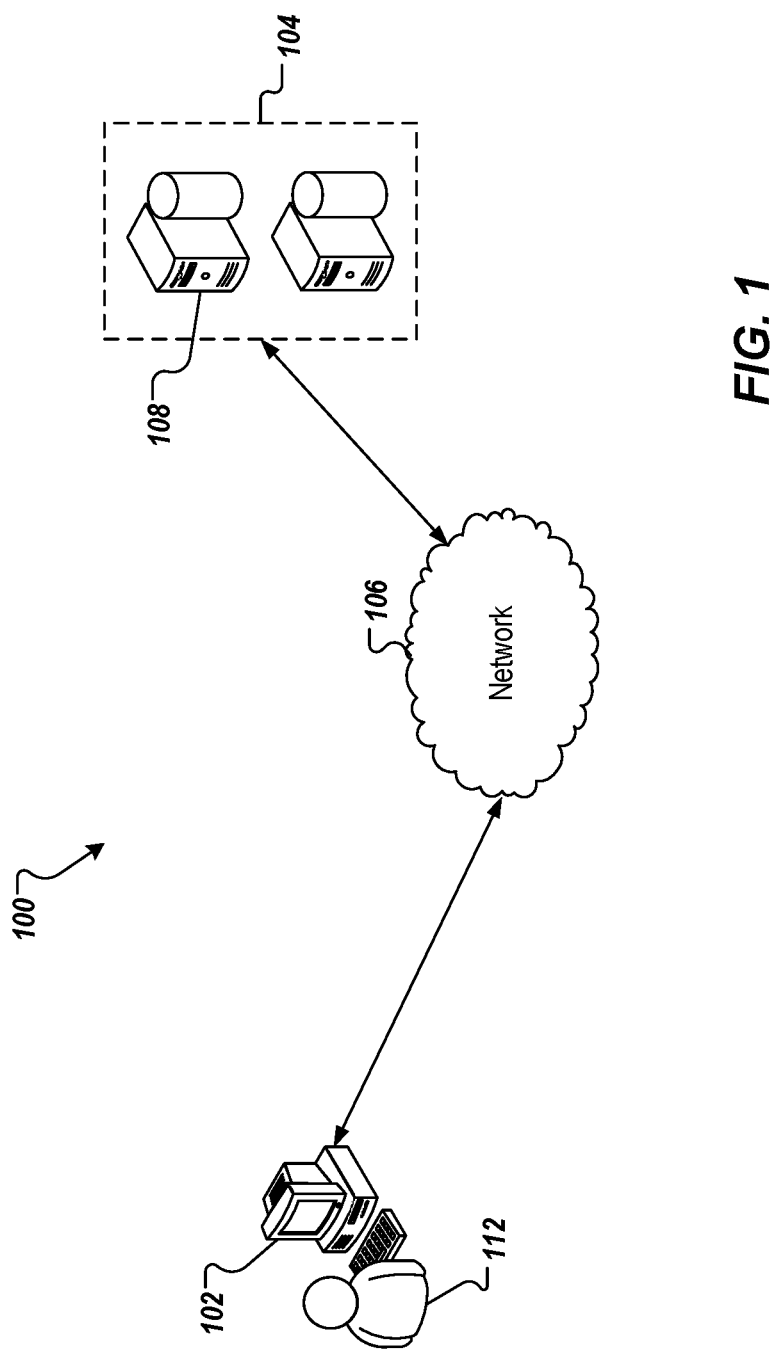
FIG. 1 depicts an example architecture that can be used to execute implementations of the present disclosure.

Implementations of the present disclosure are directed to analytical tools for data reporting. More particularly, implementations of the present disclosure are directed to a semantic context service that persists semantic context across multiple analytical tools. Implementations can include actions of receiving, by a semantic context service, a semantic context associated with a report generated by a first analytical tool, storing, by the semantic context service, the semantic context, receiving, by the semantic context service, a semantic context request from a second analytical tool, the semantic context request including a set of parameters, determining, by the semantic context service, a response to the semantic context request based on the set of parameters, the response including the semantic context, and returning, by the semantic context service, the response to the second analytical tool, the second analytical tool applying the semantic context to a report generated by the second analytical tool.

To provide further context for implementations of the present disclosure, and as introduced above, enterprises can generate and operate based on massive amounts of data from various data sources. To enable effective use of the data, analytical tools can be implemented to provide reporting and data analysis functionality. For example, analytical and visualization tools can be used to process data, and provide reports and visualizations to enable users to understand, and make practical use of the data. A semantic layer can be provided that enables a practical representation (e.g., business representation) of the underlying data, and enables users to interact with the data without having to know the complexities of the underlying data sources.

In traditional reporting systems, users are provided with an analytical dashboard that includes analytical visual artifacts. These artifacts can be provided from multiple, disparate data sources (e.g., data sources that feed into an EDW system). To assist users, features such as report element linking can be provided. In report element linking, data context can be passed to the linked visualizations within the same reporting document. Such links, however, are manually established so the user can carry forward the analytical context. This becomes complicated when the user has multiple, disparate analytical tools, each of which provides a respective user experience. Consequently, in working across analytical tools, the analytical, semantic context, in which a user is operating, is lost and needs to be reset within each analytical tool.

In view of the above context, implementations of the present disclosure provide a semantic context service that persists semantic element link contexts, and uses semantic element link contexts across multiple analytical visual artifacts. More particularly, and as described in further detail herein, the semantic context service of the present disclosure functions as a storage and retrieval service for semantic context, and provides schema context for respective analytical sources (e.g., analytical tools).

Implementations of the present disclosure are described in further detail herein with reference to example systems, and analytical tools. Example systems, and analytical tools include SAP Business Objects Universe (BOU), SAP Lumira, and SAP Design Studio, each provided by SAP SE of Walldorf, Germany.

In general, BOU functions as a semantic layer between underlying data sources, user-facing frontends, translating tables and columns, for example, to meaningful, user-friendly terms (e.g., business terms). That is, the BOU provides a semantic abstraction layer, abstracting underlying data sources. The BOU can connect to various, disparate sources, and each generally has a context that is not practical for all users (e.g., more technical, and not business-friendly). The BOU helps make sense of, for example, measures, and dimensions, such that non-technical users can analyze data (e.g., product sales in different locations). In general, SAP Lumira is a platform for data analytics and generation of visualizations in various graphical formats (e.g., bars, lines, heat maps). Lumira provides functionality of exploratory analysis, through which users can manipulate dimensions, and measures, for example, to gain insight into the underlying data. In general, SAP Design Studio enables users to create analysis applications and dashboards for browsers, and mobile devices. In some examples, Design Studio used predefined reports (templates), and analytics UI tools to construct dashboards.

Although example systems, and analytical tools are referenced herein to illustrate implementations of the present disclosure, it is contemplated that implementations of the present disclosure can be realized with any appropriate system, and/or analytical tools.

Users can use multiple analytical tools to provide analytics, reporting, and visualization for one or more data sets. Each analytical tool uses the same underlying semantic connection, but the analytical tools rely on different contexts. For example, Lumira can connect with multiple data sources using a direct connection, and using a specific context of the respective sources. For example, Lumira, can create multiple data sets, and link the datasets to multiple visualizations. One dataset can include a first dimension (e.g., country), and another dataset can include a second dimension (e.g., city). In some examples, a semantic context element link enables users to pass context form one source to another source (e.g., filter on city, and pass city context o second visualization).

In some implementations, the semantic context is represented within metadata that is expressed in formats that are specific to respective analytical tools. For example, in SAP Design Studio, a fundamental semantic artifact is a data-source object. The data-source object originates as a result of a semantic connection, and includes an analytical state in combinations of dimensions, measures, and filters. The data-source object stores such state and metadata in a custom format. As another example, SAP Lumira stores state and metadata in a custom format. As described in further detail herein, the semantic context service of the present disclosure enables a global semantic context to be provided across all analytical tools, regardless of their disparate, custom formats.

Implementations of the present disclosure enable users to express elements to use for a global semantic context. In some implementations, users can set the global semantic context at the level of each visual analytical artifact. In some examples, the user selections function as a publication of the global semantic context into a data object repository. For example, for a particular semantic context, the user can select a data source indicator (e.g., DS_16), and a dimension identifier (e.g., DIM:ID_74), which provides the semantic publishing context. This selection indicates that the user wants to propagate the semantic context for the subscribers (e.g., analytical tools subscribing to the semantic context service).

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a semantic context service in accordance with implementations of the present disclosure. For example, the user 112 can use the computing device 102 to interact with multiple analytical tools (e.g., SAP Lumira, SAP Design Studio) to generate reports, and/or visualizations on data for a particular semantic context. In some implementations, each analytical tool can subscribe to the semantic context service, and retrieve a semantic context that can be applied to the reports, and/or visualizations generated by the respective analytical tools.

In accordance with implementations of the present disclosure, and as described herein, the semantic context service enables propagation of semantic context through a publishing mechanism. In some implementations, the analytical tools publish semantic context to semantic context service. In some implementations, for each semantic context, the semantic context service records the underlying data source connections, and what is being used (e.g., characteristics, key figures). Each analytical tool that subscribes to the semantic context service can retrieve semantic context information, which can be applied to its reports, visualizations, and the like. For example, an analytical tool can query the semantic context service for a particular dimension (e.g., country), and corresponding filters can be automatically propagated to its reports/visualizations.

Figure 2:
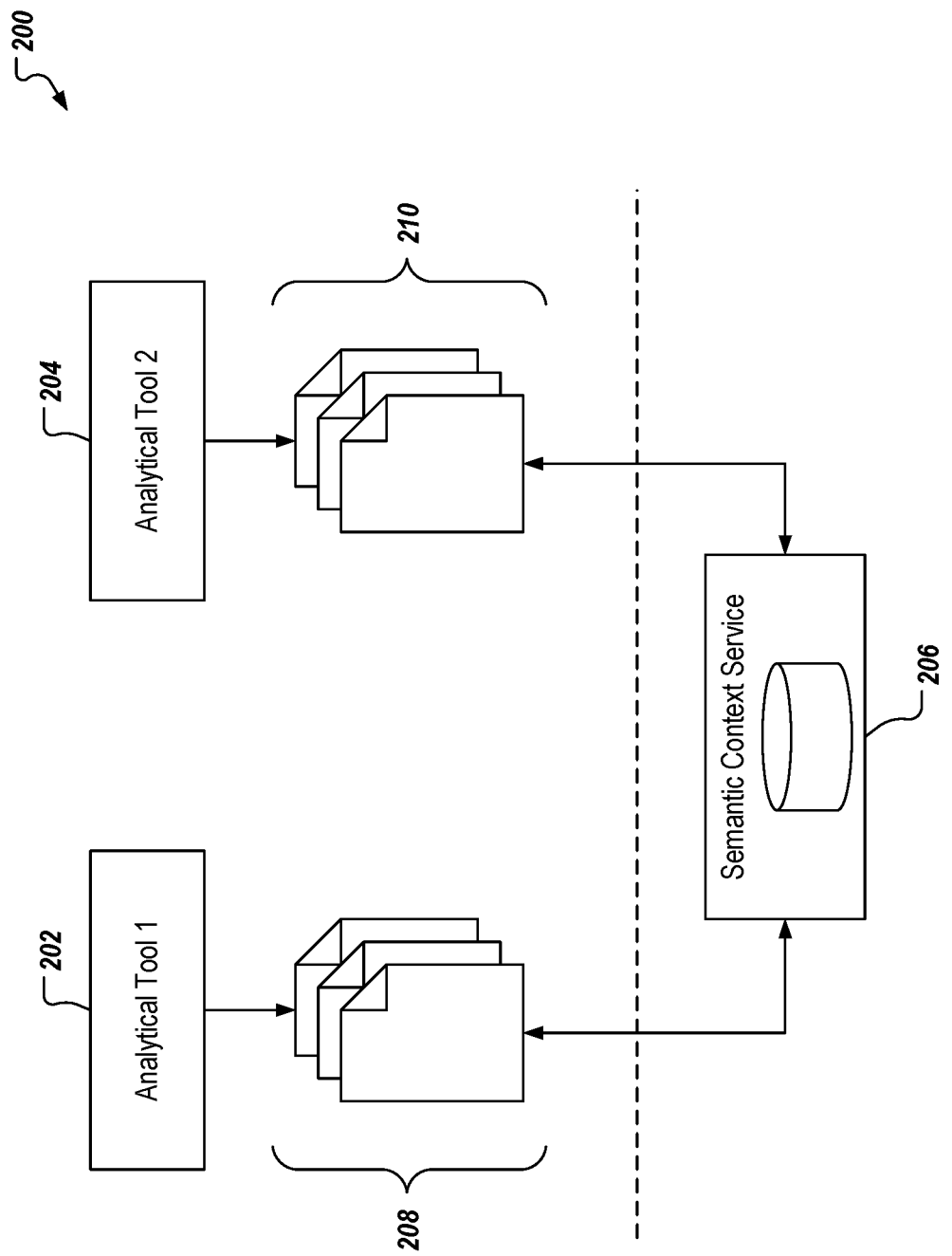
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an analytical tool 202 (e.g., SAP Design Studio), an analytical tool 204 (e.g., SAP Lumira), and a semantic context service 206. Each of the analytical tools 202, 204 can be used to generate respective reports 208, 210. In some examples, within one or more reports 208, 210, a semantic context can be provided that is to be used across one or more other reports 208, 210. For example, a user can generate a report 208 using the analytical tool 202, and provide a semantic context therein, the semantic context being linked to an element in the report 208. A user can generate a report 210 using the analytical tool 204, and use the semantic context providing in the report 208, the semantic context being linked to an element in the report 210.

In accordance with implementations of the present disclosure, the semantic context service 206 enables global semantic contexts across reports of disparate analytical tools. More particularly, and as described herein, reports/ visualizations can be created using the analytical tools 202, 204. In some examples, and although created by different analytical tools, the reports 208, 210 can use the same connection object in the underlying semantic context. Because the analytical tools 208, 210 subscribe to the semantic context service 206, the selection state is automatically propagated to the underlying analytical visual and data artifacts of the reports 208, 210. Accordingly, the semantic context service 206 enables multiple analytical tools 202, 204 to exchange the semantic context information, and reflect semantic contexts in each others reports/visualizations.

In some implementations, a filter context can be automatically selected based on a contextual element, and can be propagated across various instances (e.g., browser instances) of multiple reports, for example. In some implementations, CRUD applications (e.g., applications using forms to get data into and out of a database using create, read, update, delete functions) can publish the semantic context, and the semantic context service can translate the semantic context into underlying connections (e.g., OLAP connections). This enables the semantic context to be used in underlying OLAP-based analytical tools.

In some implementations, each analytical tool 202, 204 is associated with an application programming interface (API) that enables the respective analytical tool 202, 204 to connect with, and retrieve data from one or more data sources. Accordingly, the API can provide information regarding the connections, and dimensions of underlying data sources, and each report has metadata and definitions. For example, for a report based on multiple datasets, metadata underlying the report includes descriptions of connections to data sources, with context identifiers, data source identifiers, dimensions, current filters, and the like.

In some implementations, the metadata is provided in one or more data formats (e.g., XML, JSON). For example, the analytical tool 202 can provide the metadata in a first format, and the analytical tool 204 can provide the metadata in a second format. In some examples, a user can perform an action on a data source using an analytical tool 202 to provide a semantic context for, for example, a report within the analytical tool 202. The resulting semantic context is published to the semantic context service 206 in a standard format. The semantic context service 206 stores the semantic context within a repository. In some implementations, the analytical tool 204 can perform look-ups to the semantic context service 206. For example, a user using the analytical tool 204 can open a report, and, in response, the analytical tool 204 sends look-up call to the semantic context service 206.

In some implementations, an artifacts table (global artifacts table) is provided, which includes entries to identify certain analytical data source artifacts. These analytical artifacts can appear in different kinds of UI technologies (e.g., analytical reports and transactions system UIs. Table 1, below, provides a portion of a non-limiting example of an artifacts table, which has entries that identify a data source context:

TABLE 1

Portion of Example Artifact Table

| GLOBAL_ARTIFACT_ID | Schema Name | Package Name | AnalyticalObject | AnalyticalObject Type | FieldID |
|---|---|---|---|---|---|
| 1 | BestRun Corp | SalesAnalysis | SALESFACT | CALCULATION VIEW | CATEGORY |
| 2 | BestRun Corp | SalesAnalysis | SALESFACT | CALCULATION VIEW | CITY |
| ... | ... | ... | ... | ... | ... |
| ... | ... | ... | ... | ... | ... |

In some examples, a publishers table is provided that provides a list of publishers, and details about respective artifacts. Table 2 depicts a portion of a non-limiting examples of a publishers table:

TABLE 2

Portion of Example Publishers Table

| ID | ToolName | ToolArtifactID | ToolArtifactName | ToolSubArtifact |
|---|---|---|---|---|
| 1 | Lumira | ReportID_1 | BestRunCorpReport | Dataset_1 |
| 2 | Web Intelligence | ReportID_2 | Sales Analysis | Universe_1 |
| ... ... | | ... | ... | ... |

In some implementations, automatic subscription can be provided. For example, when a system with a UI is loaded, global artifact information is extracted from its metadata. In some examples, the system can act as publisher as well as subscriber. In automatic subscription mode, the system listens to notifications on the channel. The user interface tools will have choices to notify users in different ways. Some tools prefer to auto-apply the in-coming context. Some tools prefer to notify users asking him if changes can be applied. Table 3, below, depicts a portion of a non-limiting example subscription table:

TABLE 3

Portion of Example Subscription Table

| ID | ReportID | GLOBAL_ARTIFACT_ID | Subscription_Status |
|---|---|---|---|
| ... | 1 | 1 | Yes |
| ... | 2 | 1 | No |
| ... | ... | ... | ... |

In some examples, actions can be performed in tools (e.g., sort, filter, etc.). Table 4, below, depicts a portion of an example actions table:

TABLE 4

Portion of Example Actions Table

| ActionID | ActionName |
|---|---|
| 1 | Sort |
| 2 | Filter |
| ... | ... |

In some examples, an action context table is provided, and includes pointers to the global artifact, the action being performed, and a timestamp. Table 5, below, depicts a portion of an example action context table:

TABLE 5

Portion of Example Action Context Table

| GLOBAL_ARTIFACT_ID | ActionID | SourceID | ActionContext | Timestamp |
|---|---|---|---|---|
| 1 | 1 | 1 | Ascending | 24/04/2018 8:57 AM |
| 2 | 2 | 2 | {Washington, New York} | 24/04/2018 9:30 AM |
| ... | ... | ... | ... | ... |

Figure 3:
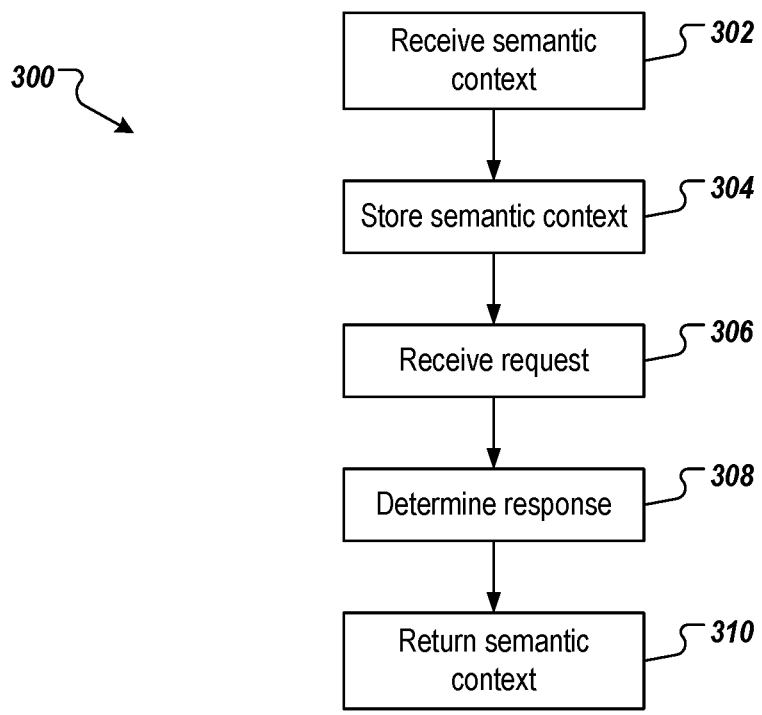
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A semantic context is received (302). For example, the semantic context is associated with a report generated by the analytical tool 202 of FIG. 2, and is received by the semantic context service 206. The semantic context is stored (304). For example, the semantic context service 206 stores the semantic context in a repository of semantic contexts. A semantic context request is received (306). For example, the semantic context service 206 receives the semantic context request from the analytical tool 204. In some examples, the semantic context request includes a set of parameters. A response to the semantic context request is determined (308). For example, the semantic context service performs a look-up to the repository based on the set of parameters to identify a semantic context that is responsive to the set of parameters. The response is provided and includes the semantic context. The semantic context is returned (310). For example, the semantic context service returns the response to the analytical tool 204. The analytical tool 204 applies the semantic context included in the response to a report generated by the analytical tool 204.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing semantic context across multiple analytical tools, the method being executed by one or more processors and comprising:

receiving, by a semantic context service, a semantic context associated with a report generated by a first analytical tool that publishes semantic contexts of the first analytical tool to the semantic context service in a first format that is specific to the first analytical tool, the semantic context at least partially comprising one or more filters, each associated with a respective dimension used by the first analytical tool in the report and being represented in metadata associated with the report;

storing, by the semantic context service, the semantic context;

receiving, by the semantic context service, a first semantic context request from a second analytical tool and a second semantic context request from a third analytical tool, the first semantic context request and the second semantic context request each comprising a set of parameters, the set of parameters at least partially comprising a dimension;

determining, by the semantic context service, a first response to the first semantic context request and a second response to the second semantic context request based on the set of parameters, the first response and the second response each comprising the semantic context of the first analytical tool in response to determining that the set of parameters comprises the dimension; and returning, by the semantic context service, the first response to the second analytical tool and the second response to the third analytical tool, the second analytical tool applying the semantic context to a report generated by the second analytical tool.

2. The method of claim 1, wherein the semantic context is automatically published to the semantic context service in response to user selection of the semantic context in the report generated by the first analytical tool.

3. The method of claim 1, wherein the semantic context is provided based on metadata of the first analytical tool.

4. The method of claim 3, wherein the metadata comprises descriptions of connections to data sources, context identifiers, data source identifiers, dimensions, and current filters.

5. The method of claim 1, wherein the first semantic context request is automatically sent by the second analytical tool in response to user action to the report generated by the second analytical tool.

6. The method of claim 1, wherein the semantic context is automatically published to the semantic context service by the first analytical tool.

7. The method of claim 1, wherein the second analytical tool subscribes to the semantic context service.

8. A non-transitory computer-readable storage medium coupled to one or more processors and having instructions stored thereon which, when executed by the one or more processors, cause the one or more processors to perform operations for providing semantic context across multiple analytical tools, the operations comprising:

receiving, by a semantic context service, a semantic context associated with a report generated by a first analytical tool that publishes semantic contexts of the first analytical tool to the semantic context service in a first format that is specific to the first analytical tool, the semantic context at least partially comprising one or more filters, each associated with a respective dimension used by the first analytical tool in the report and being represented in metadata associated with the report;

storing, by the semantic context service, the semantic context;

receiving, by the semantic context service, a first semantic context request from a second analytical tool and a second semantic context request from a third analytical tool, the first semantic context request and the second semantic context request each comprising a set of parameters, the set of parameters at least partially comprising a dimension;

determining, by the semantic context service, a first response to the first semantic context request and a second response to the second semantic context request based on the set of parameters, the first response and the second response each comprising the semantic context of the first analytical tool in response to determining that the set of parameters comprises the dimension; and returning, by the semantic context service, the first response to the second analytical tool and the second response to the third analytical tool, the second analytical tool applying the semantic context to a report generated by the second analytical tool.

9. The computer-readable storage medium of claim 8, wherein the semantic context is automatically published to the semantic context service in response to user selection of the semantic context in the report generated by the first analytical tool.

10. The computer-readable storage medium of claim 8, wherein the semantic context is provided based on metadata of the first analytical tool.

11. The computer-readable storage medium of claim 10, wherein the metadata comprises descriptions of connections to data sources, context identifiers, data source identifiers, dimensions, and current filters.

12. The computer-readable storage medium of claim 8, wherein the first semantic context request is automatically sent by the second analytical tool in response to user action to the report generated by the second analytical tool.

13. The computer-readable storage medium of claim 8, wherein the semantic context is automatically published to the semantic context service by the first analytical tool.

14. The computer-readable storage medium of claim 8, wherein the second analytical tool subscribes to the semantic context service.

15. A system, comprising:

a computing device; and a computer-readable storage device coupled to the computing device and having instructions stored thereon which, when executed by the computing device, cause the computing device to perform operations for providing semantic context across multiple analytical tools, the operations comprising:

receiving, by a semantic context service, a semantic context associated with a report generated by a first analytical tool that publishes semantic contexts of the first analytical tool to the semantic context service in a first format that is specific to the first analytical tool, the semantic context at least partially comprising one or more filters, each associated with a respective dimension used by the first analytical tool in the report and being represented in metadata associated with the report;

storing, by the semantic context service, the semantic context;

receiving, by the semantic context service, a first semantic context request from a second analytical tool and a second semantic context request from a third analytical tool, the first semantic context request and the second semantic context request each comprising a set of parameters, the set of parameters at least partially comprising a dimension;

determining, by the semantic context service, a first response to the first semantic context request and a second response to the second semantic context request based on the set of parameters, the first response and the second response each comprising the semantic context of the first analytical tool in response to determining that the set of parameters comprises the dimension; and returning, by the semantic context service, the first response to the second analytical tool and the second response to the third analytical tool, the second analytical tool applying the semantic context to a report generated by the second analytical tool.

16. The system of claim 15, wherein the semantic context is automatically published to the semantic context service in response to user selection of the semantic context in the report generated by the first analytical tool.

17. The system of claim 15, wherein the semantic context is provided based on metadata of the first analytical tool.

18. The system of claim 17, wherein the metadata comprises descriptions of connections to data sources, context identifiers, data source identifiers, dimensions, and current filters.

19. The system of claim 15, wherein the first semantic context request is automatically sent by the second analytical tool in response to user action to the report generated by the second analytical tool.

20. The system of claim 15, wherein the semantic context is automatically published to the semantic context service by the first analytical tool.

* * * * *